United States Patent Office 2,976,276
Patented Mar. 21, 1961

2,976,276
PURE VITAMIN $B_{12}$ AND METHOD OF MAKING SAME

Gerard Nomine, Noisy-le-Sec, Lucien Penasse, Paris, and Pierre Barthelemy, St.-Germain-en-Laye, France, assignors to UCLAF, Paris, France, a body corporate of France No Drawing. Filed Feb. 20, 1958, Ser. No. 716,271

Claims priority, application France Mar. 13, 1957

6 Claims. (Cl. 260—211.5)

This invention relates to pure vitamin $B_{12}$ and to a method of making same.

In our copending application Serial No. 602,874, filed August 8, 1956, and of which the present is a continuation-in-part, there is described a method of preparing hydrated phenolic crystallizates of cyanocobalamine making it possible to produce crystallized Codex vitamin $B_{12}$ starting from aqueous concentrates of cyanocobalamine titrating less than 95% of the dry extract of vitamin $B_{12}$ and at least 0.05% of this compound by volume. In this described process there is added about 2% of the volume of the vitamin $B_{12}$ concentrate in phenol, and on separating, such as by centrifuging, and by drying there is obtained a corresponding crystallizate of the general formula:

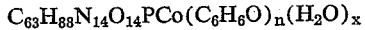

The vitamin $B_{12}$ may be regenerated from these complexes by redissolution in water and the addition of a water-soluble solvent wherein it is insoluble.

It is an object of the present invention to provide a method of obtaining pure vitamin $B_{12}$ using polyphenols in the method to obtain vitamin $B_{12}$ phenol complexes.

One other object of the present invention is to provide hydrated vitamin $B_{12}$ phenolic complexes as new products of manufacture.

Other objects and features will become apparent from the following description of the invention and the accompanying claims.

It has been found in accordance with the present invention that other phenols, notably di- or triphenols, namely orcinol, phloroglucinol or hydroquinone, designated by the letter R in the formula below, are also capable of supplying crystallized complexes of the formula:

wherein $n$ represents the numeral 2 or 4 and $x$ represents a value ranging between 4 and 11. These compounds may be used to isolate vitamin $B_{12}$ from the aqueous concentrates of the latter.

The invention herein, therefore, also relates to the hydrated phenolic complexes prepared according to the process of the invention as new commercial products. In order to prepare these hydrated phenolic complexes, a desired quantity of phenol is added to an aqueous solution of vitamin $B_{12}$, said quantity being below the limit of solubility of the phenol in question in water. The complex that forms is separated (centrifuged). By being suspended in water, it separates (dissociates), vitamin $B_{12}$ is released and dissolves. By adding a water-soluble solvent wherein vitamin $B_{12}$ is insoluble, the latter precipitates.

In accordance with the above description there are given the following examples which serve to illustrate the invention without however limiting its scope. In particular, it is possible to change the origin and the concentration of the vitamin $B_{12}$ solution, the concentration of phenol, the quantities of water used to redissolve the hydrated phenolic complex of vitamin $B_{12}$, and the nature of the solvent used for reprecipitating vitamin $B_{12}$, or reverse the order of introducing the compounds without thereby exceeding or departing from the scope of the invention.

EXAMPLE 1

*Formation of the hydrated vitamin $B_{12}$-orcinol complex*

800 mg. orcinol are added to 20 cc. of an aqueous solution of 200 mg. cyanocobalamine, and the mixture is made lukewarm until it is dissolved. The mixture is left in a refrigerator overnight, then is separated or centrifuged and dried in vacuo at room temperature. The resultant crystals thus obtained are washed with ether in order to eliminate possible excess orcinol and are again dried in vacuo at room temperature. The dark red crystals thus formed, about 271 mg., are insoluble in acetone and ether, but soluble in alcohol. They separate in water releasing vitamin $B_{12}$.

The crystals comprise 70.1% of vitamin $B_{12}$. When dried in vacuo at 60° C., they lose 9.9% of their weight in water. The product dried in this manner comprises 76% of vitamin $B_{12}$, which permits one to conclude that this is a combination of 4 molecules of orcinol and one molecule of vitamin $B_{12}$.

An analysis shows vitamin $B_{12}$—4 orcinol in the anhydrous product.

As calculated: C=59%; H=6.53%; N=10.58%; $B_{12}$=73.19%.
As found: C=58.8%; H=6.6%; N=11.1%; $B_{12}$=76%. Hydration after loss=$11H_2O$.

This compound has not been described in the past and is new.

Upon dissolution in 100 parts of water and on addition of dioxane or acetone, 10 volumes, there is recovered crystallized vitamin $B_{12}$ titrating above 95% and with a practically quantitative yield.

EXAMPLE 2

*Formation of the hydrated vitamin $B_{12}$-phloroglucinol complex*

The method of Example 1 is followed herein and 200 mg. of phloroglucinol are used for 20 cc. of an aqueous solution of 200 mg. vitamin $B_{12}$. There are produced 113 mg. of dark red crystals insoluble in acetone and ether, but soluble in alcohol, which separate or dissociate in water releasing vitamin $B_{12}$. The crystals comprise 83% of vitamin $B_{12}$. When dried in vacuo at 60° C., they lose 8.8% of their weight in water. The product dried in this manner comprises 90% of vitamin $B_{12}$, permitting one to conclude that this is a combination of 2 molecules of phloroglucinol and one molecule of vitamin $B_{12}$ containing 8 to 9 molecules of water.

An analysis of the anhydrous product vitamin $B_{12}$—2 phloroglucinol shows:
As calculated: C=56.03%; H=6.27%; N=12.19%; $B_{12}$=84.33%.
As found: C=56%; H=6.2%; N=11.9%; $B_{12}$=90%.

This compound has not been described in the past and is new.

EXAMPLE 3

*Formation of the hydrated vitamin $B_{12}$-hydroquinone complex*

The method of Example 1 is followed herein, and 1 g. of hydroquinone is used for 20 cc. of an aqueous solution of 200 mg. vitamin $B_{12}$. There are thereby produced 142 mg. of dark red crystals insoluble in acetone and ether, but soluble in alcohol, and which separate in water releasing vitamin $B_{12}$. They comprise 72.5% vitamin $B_{12}$. When dried in vacuo at 60° C. they lose 7.6% of their weight in water. The dehydrated product comprises 78% vitamin $B_{12}$, which permits one to conclude that this is a combination of 4 molecules of hydroquinone and one molecule of vitamin $B_{12}$.

On analysis there is obtained vitamin $B_{12}$—4 hydroquinone which shows:

As calculated: C=58.19%; H=6.28%; N=10.92%; $B_{12}$=75.4%.

As found: C=58%; H=6.1%; N=11.2%; $B_{12}$=78%.

This product has not been described in the past and is new.

The vitamin $B_{12}$ formula indicated in the copending patent application Serial No. 602,874 is $C_{63}H_{90}N_{14}O_{14}PCo$. Since this formula has been modified by Crowfoot Hodgkin and coll. (Nature, 1956, 178, 65), who ascribe to vitamin $B_{12}$ the formula $C_{63}H_{88}N_{14}O_{14}PCo$, the analytical figures have been calculated on the basis of this new formula.

While several examples of the invention have been described, it is to be noted that they are not restrictive and that changes as to form and use of materials may be made without departing from the spirit and scope of the invention as claimed.

We claim:

1. The method of preparing substantially pure cyanocobalamine complex which comprises reacting an aqueous solution of vitamin $B_{12}$ containing a minimum of 0.05% of vitamin $B_{12}$ with an amount of a phenol selected from the group consisting of orcinol, phloroglucinol and hydroquinone, which is below the limit of solubility of the phenol in an aqueous solution of vitamin $B_{12}$, crystallizing the resultant vitamin $B_{12}$ phenol complex, separating, redissolving in water, precipitating the cyanocobalamine therein by the addition of a water miscible solvent selected from the group consisting of dioxane and acetone.

2. In a process of preparing substantially pure cyanocobalamine the steps which comprise reacting an aqueous solution of vitamin $B_{12}$ containing at least 0.05% of vitamin $B_{12}$ with an amount of orcinol which is below the limit of its solubility in an aqueous solution of vitamin $B_{12}$, crystallizing the resulting hydrated vitamin $B_{12}$-orcinol complex compound, separating said crystals, redissolving the same in water, and precipitating the cyanocobalamine.

3. In a process of preparing substantially pure cyanocobalamine the steps which comprise reacting an aqueous solution of vitamin $B_{12}$ containing at least 0.05% of vitamin $B_{12}$ with an amount of phloroglucinol which is below the limit of its solubility in an aqueous solution of vitamin $B_{12}$, crystallizing the resulting hydrated vitamin $B_{12}$-phloroglucinol complex compound, separating said crystals, redissolving the same in water, and precipitating the cyanocobalamine.

4. In a process of preparing substantially pure cyanocobalamine, the steps which comprise reacting an aqueous solution of vitamin $B_{12}$ containing at least 0.05% of vitamin $B_{12}$ with an amount of hydroquinone which is below the limit of its solubility in an aqueous solution of vitamin $B_{12}$, crystallizing the resulting hydrated vitamin $B_{12}$-hydroquinone complex compound, separating said crystals, redissolving the same in water, and precipitating the cyanocobalamine.

5. In a process of preparing substantially pure cyanobalamine, the steps which comprise reacting an aqueous solution of vitamin $B_{12}$ containing at least 0.05% of vitamin $B_{12}$ with a polyphenol selected from the group consisting of a phenol having two phenolic hydroxyl groups and of a phenol having three phenolic hydroxyl groups, said polyphenol being added in an amount which is below the limit of its solubility in an aqueous solution of vitamin $B_{12}$, crystallizing the resulting hydrated vitamin $B_{12}$-phenolic complex compound, separating said crystals, redissolving the same in water, and precipitating the cyanocobalamine.

6. A hydrated crystalline vitamin $B_{12}$-phenolic complex compound corresponding to the formula $$C_{63}H_{88}N_{14}O_{14}PCo \cdot (R)_n \cdot (H_2O)_x$$

wherein:

R is a phenol selected from the group consisting of orcinol, phloroglucinol, and hydroquinone;

$n$ is an integer selected from the integers 2 and 4, and $x$ is an integer ranging from 4–11.

References Cited in the file of this patent

UNITED STATES PATENTS 2,823,165     Bernhauer et al.          Feb. 11, 1958

OTHER REFERENCES

Bernhauer et al.: Angewandte Chemie, 66 (24), 776–780 (1954).